United States Patent
Nakamura

(10) Patent No.: US 9,786,899 B2
(45) Date of Patent: Oct. 10, 2017

(54) TERMINAL COMPONENT AND METHOD OF MANUFACTURING TERMINAL COMPONENT

(71) Applicant: TOYOTA JIDOSHA KABUSHIKI KAISHA, Toyota-shi, Aichi-ken (JP)

(72) Inventor: Kosuke Nakamura, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/940,870

(22) Filed: Nov. 13, 2015

(65) Prior Publication Data

US 2016/0141592 A1    May 19, 2016

(30) Foreign Application Priority Data

Nov. 14, 2014   (JP) .................. 2014-231752

(51) Int. Cl.
*H01M 2/30* (2006.01)
*H01M 2/06* (2006.01)

(52) U.S. Cl.
CPC ............ *H01M 2/30* (2013.01); *H01M 2/06* (2013.01)

(58) Field of Classification Search
None
See application file for complete search history.

(56) References Cited

U.S. PATENT DOCUMENTS

| 2011/0268999 A1 | 11/2011 | Nagai |
| 2013/0224536 A1 | 8/2013 | Hattori et al. |
| 2014/0242439 A1 | 8/2014 | Hattori et al. |

FOREIGN PATENT DOCUMENTS

| JP | 3030634 B1 | 4/2000 |
| JP | 2013-161629 A | 8/2013 |
| JP | 2014-167846 A | 9/2014 |
| JP | 2015-153521 A | 8/2015 |
| KR | 10-2011-0043515 A | 4/2011 |
| WO | 2010/146701 A1 | 12/2010 |

*Primary Examiner* — Wyatt McConnell
(74) *Attorney, Agent, or Firm* — Sughrue Mion, PLLC

(57) ABSTRACT

A terminal component includes an external terminal that is provided above a cover covering an electrode body; and an internal terminal that is provided below the cover and extends through a through-hole of the external terminal. A part of the internal terminal protrudes above the external terminal. A dimension of the part of the internal terminal in a radial direction of the through-hole is larger than a diameter of the through-hole. The external terminal has a joint surface that is a first part of an upper surface of the external terminal and that is joined to the internal terminal, and a non-joint surface that is a second part of the upper surface of the external terminal and that is located outside the joint surface. The joint surface is located higher than at least part of the non-joint surface.

4 Claims, 5 Drawing Sheets

COMPARATIVE EXAMPLE

COMPARATIVE EXAMPLE

TERMINAL COMPONENT AND METHOD OF MANUFACTURING TERMINAL COMPONENT

INCORPORATION BY REFERENCE

The disclosure of Japanese Patent Application No. 2014-231752 filed on Nov. 14, 2014 including the specification, drawings and abstract is incorporated herein by reference in its entirety.

BACKGROUND OF THE INVENTION

1. Field of the Invention

The invention relates to a terminal component and a method of manufacturing the terminal component, and more particularly, to a terminal component having an internal terminal and an external terminal joined to each other, and a method of manufacturing the terminal component.

2. Description of Related Art

Terminal portions of a battery or the like are often joined to each other through laser welding in order to ensure conduction of the terminal portions. However, the cost required for laser welding is high. Therefore, it has been considered to join the terminal portions to each other with the aid of adhesion joining such as caulking or the like.

As for the aforementioned art, Japanese Patent Application Publication No. 2013-161629 (JP 2013-161629 A) discloses a method of manufacturing a secondary battery that is equipped with an electrode body, a case that accommodates the electrode body, an external terminal that is provided so as to protrude outward of the case, a collector terminal that connects the electrode body and the external terminal to each other, and a gasket that is interposed between the collector terminal and the case. The method of manufacturing the secondary battery according to Japanese Patent Application Publication No. 2013-161629 (JP 2013-161629 A) includes a process of protruding part of the collector terminal outward of the case in such a manner as to pass through part of the external terminal, subjecting a protrusion portion of the collector terminal to caulking to apply a compressive force to the gasket, pressing a caulking portion formed through this caulking while applying heat thereto, and joining the caulking portion and the external terminal to each other.

A water droplet may adhere to the surface of the battery due to condensation or the like. However, with the manufacturing method according to Japanese Patent Application Publication No. 2013-161629 (JP 2013-161629 A), a water droplet may enter a gap between the external terminal and the internal terminal (the collector terminal) that are joined to each other. Then, the joint portion of the external terminal and the internal terminal may corrode due to the entrance of a water droplet into the gap. Furthermore, the conduction resistance (electric resistance) between the external terminal and the internal terminal may rise due to corrosion of the joint portion.

SUMMARY OF THE INVENTION

The invention provides a terminal component that can restrain the conduction resistance (electric resistance) between an external terminal and an internal terminal from rising, and a method of manufacturing the terminal component.

A first aspect of the present invention relates to a terminal component comprising: an external terminal that is provided above a cover covering an electrode body; and an internal terminal that is provided below the cover and extends through a through-hole of the external terminal. A part of the internal terminal protrudes above the external terminal. A dimension of the part of the internal terminal in a radial direction of the through-hole is larger than a diameter of the through-hole. The external terminal has a joint surface that is a first part of an upper surface of the external terminal and that is joined to the internal terminal, and a non-joint surface that is a second part of the upper surface of the external terminal and that is located outside the joint surface. The joint surface is located higher than at least part of the non-joint surface.

A second aspect of a method of manufacturing a terminal component, comprising: manufacturing an external terminal having a through-hole, a pedestal that is provided outside the through-hole, and a non-joint surface that is formed outside the pedestal so as to be located lower than an upper surface of the pedestal; and joining an internal terminal and the external terminal to each other by passing a part of the internal terminal through the through-hole of the external terminal in such a manner as to protrude the part of the internal terminal above the external terminal, and expanding the protruded part of the internal terminal in such a manner as to come into contact with the upper surface of the pedestal.

The joint surface (the pedestal surface) of the external terminal is formed so as to be located higher than at least part of the non-joint surface, so the water droplet that has adhered to the non-joint surface is restrained from entering a gap between the internal terminal and the external terminal. Thus, corrosion can be restrained from occurring as a result of the moisture (water) that has entered the gap between the internal terminal and the external terminal. Accordingly, the invention makes it possible to restrain the conduction resistance between the external terminal and the internal terminal from rising.

Besides, the expanded internal terminal may be equipped with a bulge portion that bulges more outward than the joint surface of the external terminal. The internal terminal bulges more outward than the joint surface of the external terminal, so the water droplet that has adhered to an upper side of the internal terminal falls onto the non-joint surface. Thus, the water droplet that has adhered to the upper side of the internal terminal is further restrained from entering the gap between the internal terminal and the external terminal.

Besides, the non-joint surface of the external terminal may be equipped with a recess portion. The recess portion is formed in the non-joint surface, so the water droplet that has adhered to the non-joint surface enters the recess portion. Thus, the water droplet that has adhered to the non-joint surface is further restrained from entering the gap between the internal terminal and the external terminal.

The invention makes it possible to provide a terminal component that can restrain the conduction resistance between an external terminal and an internal terminal from rising, and a method of manufacturing the terminal component.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
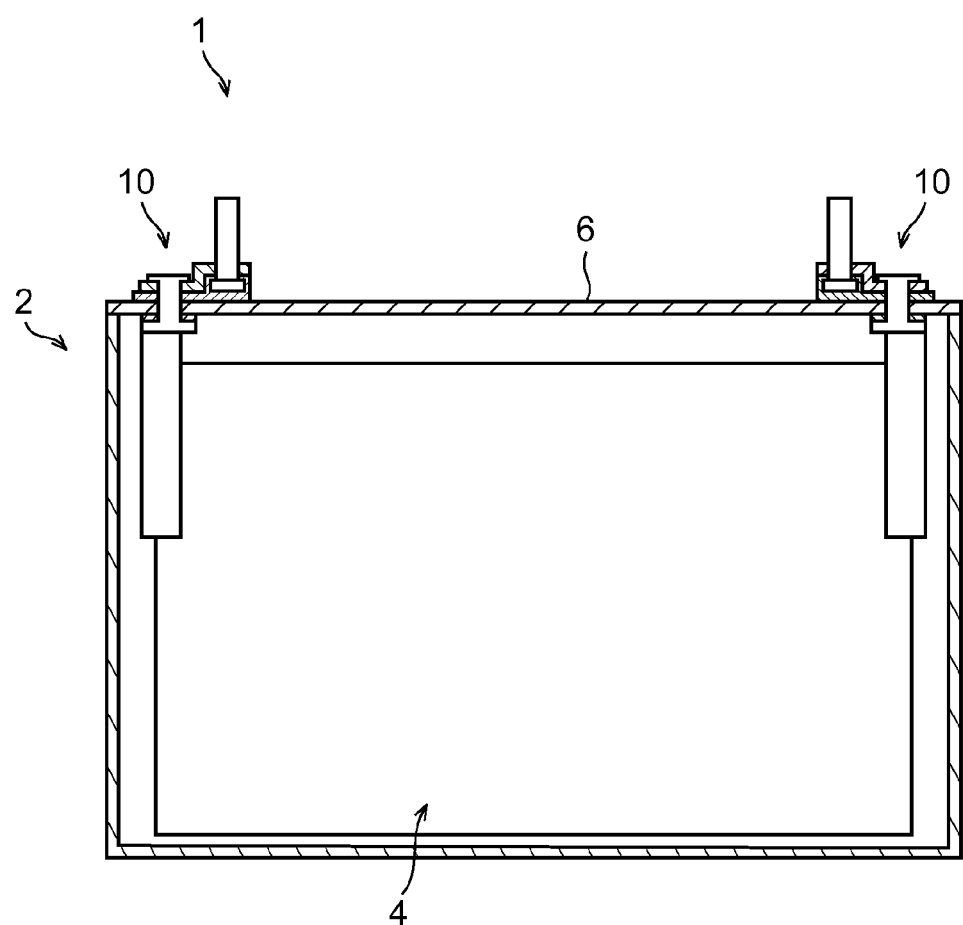
FIG. 1 is a schematic view of a battery according to the first embodiment of the invention.

The embodiments of the invention will be described hereinafter with reference to the drawings. FIG. 1 is a schematic view of a battery 1 according to the first embodiment of the invention. The battery 1 is, for example, a secondary battery. As shown in FIG. 1, the battery 1 has a case 2 and an electrode body 4 as a charge/discharge element. The electrode body 4 is accommodated inside the case 2. Besides, the case 2 has a cover 6 that functions as a lid covering the electrode body 4. Besides, the cover 6 is provided with terminal components 10 of a positive electrode and a negative electrode.

Figure 2:
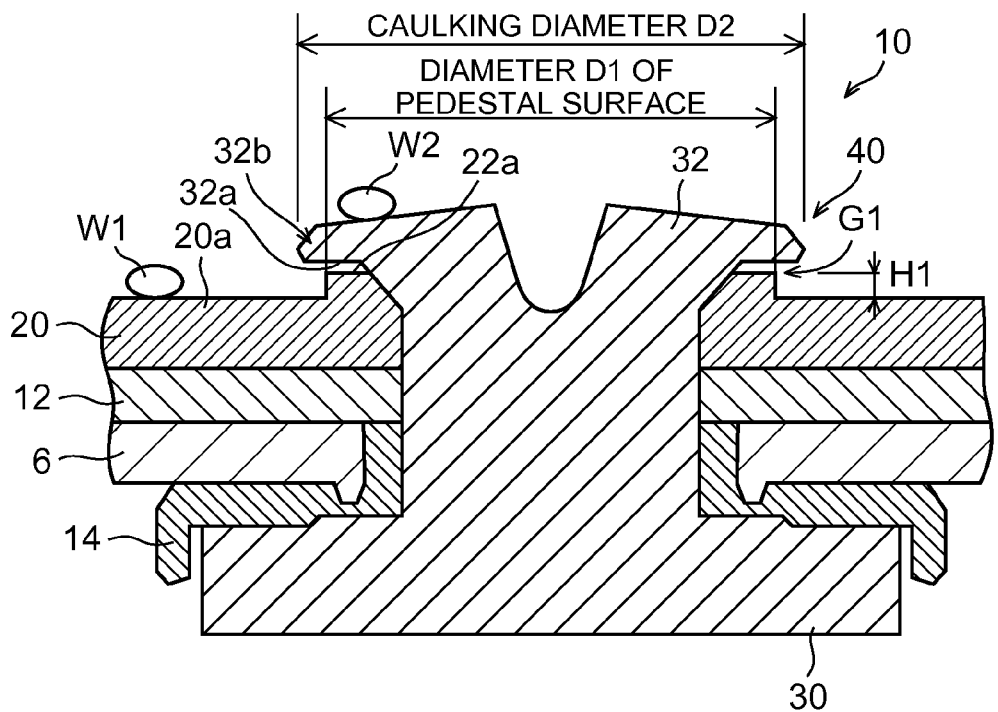
FIG. 2 is a cross-sectional view showing the configuration of a terminal component according to the first embodiment of the invention.

FIG. 2 is a cross-sectional view showing the configuration of each of the terminal components 10 according to the first embodiment of the invention. As shown in FIG. 2, the terminal component 10 has an external terminal 20 and an internal terminal 30. The external terminal 20 is provided above the cover 6. Besides, the internal terminal 30 is provided below the cover 6. Besides, the external terminal 20 and the internal terminal 30 are connected to each other in such a manner as to be electrically conductive with each other. Furthermore, the internal terminal 30 is electrically connected to the electrode body 4. Thus, the external terminal 20 is configured to be electrically connected to the electrode body 4.

A resin member 12 is provided between the external terminal 20 and the cover 6. The resin member 12 is formed of an insulating material. The external terminal 20 is insulated from the cover 6 by the resin member 12. Besides, a sealing member 14 is provided between the internal terminal 30 on the one hand and the cover 6 and the resin member 12 on the other hand. The sealing member 14 is formed of, for example, a gasket or the like. The interior of the case 2 is held airtight, and the internal terminal 30 is insulated from the cover 6 by the sealing member 14.

Besides, the internal terminal 30 is caulked against the external terminal 20, so the internal terminal 30 and the external terminal 20 form a joint portion 40. The internal terminal 30 and the external terminal 20 are joined to the cover 6 by this joint portion 40. Furthermore, by being joined to each other at the joint portion 40, the internal terminal 30 and the external terminal 20 are joined to each other in such a manner as to be electrically conductive with each other. In the first embodiment of the invention, moisture (water) is restrained from entering the gap between the internal terminal 30 and the external terminal 20 at the joint portion 40. The details will be described later.

Figure 3:
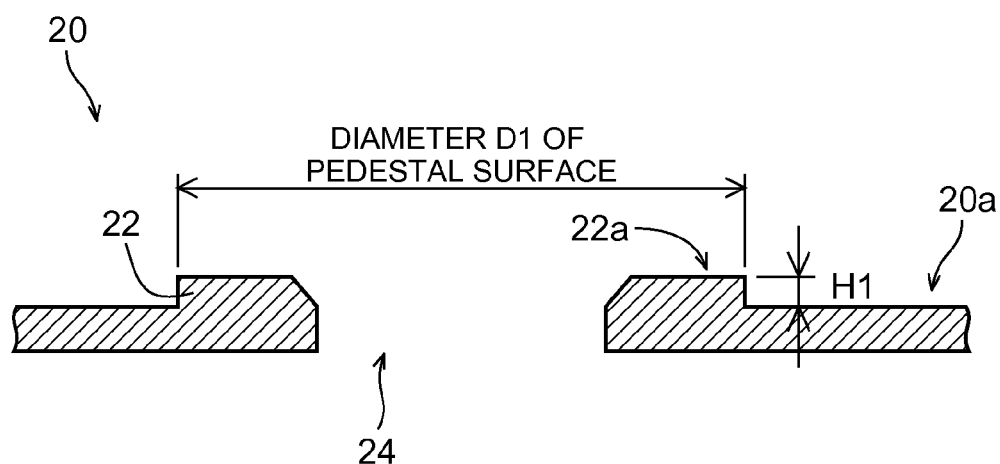
FIG. 3 is a cross-sectional view showing the structure of an external terminal according to the first embodiment of the invention.

FIG. 3 is a cross-sectional view showing the structure of the external terminal 20 according to the first embodiment of the invention. A through-hole 24 is provided through the external terminal 20. As will be described later using FIG. 4, when the internal terminal 30 is caulked against the external terminal 20, part of the internal terminal 30 is inserted into this through-hole 24.

Besides, a pedestal 22 is provided outside the through-hole 24. As will be described later, a pedestal surface 22a as an upper surface of the pedestal 22 is configured to be joined to part of the caulked internal terminal 30. That is, the pedestal surface 22a is a joint surface that is joined to the internal terminal 30. Besides, the pedestal surface 22a is formed such that the diameter thereof (i.e., the diameter of an outer periphery of the pedestal 22) is equal to D1 (mm). Besides, the pedestal surface 22a is formed so as to be located higher than a non-joint surface 20a, which is a surface outside the pedestal 22 (the pedestal surface 22a) on an upper surface of the external terminal 20. In other words, the non-joint surface 20a is formed so as to be located lower than the pedestal surface 22a.

For example, the pedestal 22 may be formed such that the upper surface of the external terminal 20 (the non-joint surface 20a) outside the pedestal 22 is located lower than the upper surface 22a of the pedestal 22. Specifically, the pedestal 22 may be formed by thinning the outside of a circle with the diameter of D1 (the diameter of the pedestal surface 22a) around a center of the through-hole 24. Specifically, the pedestal 22 may be molded on the external terminal 20 through pressing or forging. Alternatively, the pedestal 22 may be molded on the external terminal 20 by cutting the part corresponding to the non-joint surface 20a. Besides, the pedestal 22 may be formed by using, for example, a mold that is provided with a region (a recess) corresponding to the pedestal 22.

In this manner, the external terminal 20 is formed such that the pedestal surface 22a of the pedestal 22 is located higher than the non-joint surface 20a by H1 (mm). In other words, the external terminal 20 is formed such that the non-joint surface 20a of the upper surface of the external terminal 20 is located lower than the pedestal surface 22a by H1 (mm). The pedestal 22 is thus formed around the through-hole 24, so water droplet is restrained from entering the gap between the external terminal 20 and the internal terminal 30 at the joint portion 40. The details will be described later.

Figure 4:
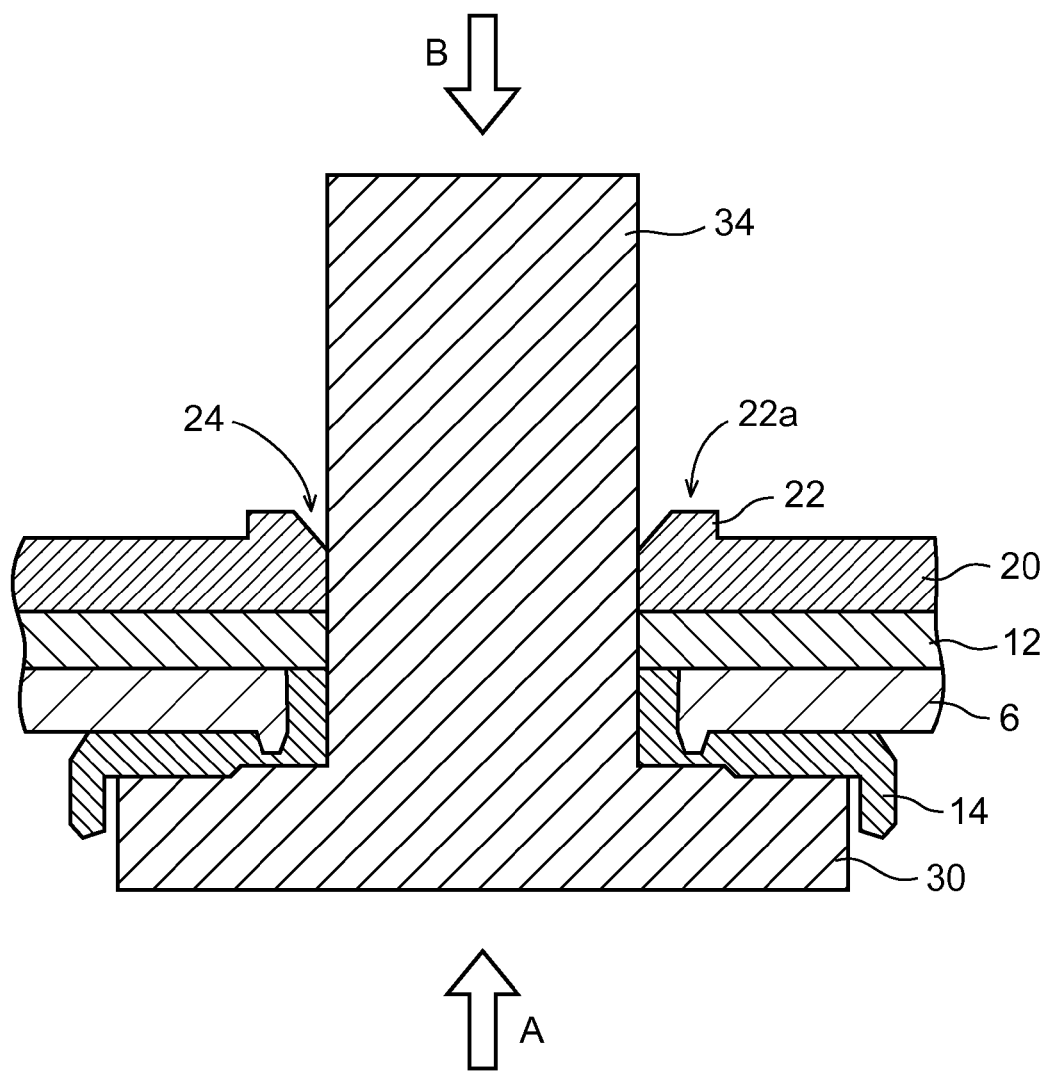
FIG. 4 is a view for explaining caulking according to the first embodiment of the invention.

FIG. 4 is a view for explaining caulking according to the first embodiment of the invention. As shown in FIG. 4, the internal terminal 30 is formed substantially in the shape of the letter T having a protrusion portion 34 before being caulked. Then, when the internal terminal 30 is caulked, the protrusion portion 34 of the internal terminal 30 is inserted into the through-hole 24 as indicated by an arrow A with the external terminal 20, the resin member 12, the cover 6 and the sealing member 14 stacked on one another.

Then, the protrusion portion 34 is pressed against the internal terminal 30 in a direction of an arrow B. Thus, the protrusion portion 34 of the internal terminal 30 deforms in such a manner as to expand more in a radial direction than the through-hole 24. Then, as shown in FIG. 2, an umbrella-shaped caulking portion 32 is formed at the joint portion 40.

A downward (toward the external terminal 20 side) pressing force is applied to the caulking portion 32. Thus, the internal terminal 30 is adhesively joined to the external terminal 20 at the joint portion 40. Specifically, at the joint portion 40, a joint surface 32a of the caulking portion 32 is in contact with the pedestal surface 22a of the pedestal 22 that is formed on the external terminal 20 in a state of being pressed thereagainst. In this manner, the joint portion 40 that is constituted of the pedestal 22 of the external terminal 20 and the caulking portion 32 of the internal terminal 30 is formed.

It should be noted herein that the pedestal 22 is formed such that the pedestal surface 22a is located higher than the non-joint surface 20a by a height of H1 (mm) as described above. Thus, a water droplet W1 that has adhered to a surface (the non-joint surface 20a) of the external terminal 20 is restrained from entering a space (a gap G1) between the pedestal surface 22a (the joint surface) of the pedestal 22 that is formed on the external terminal 20 and the joint surface 32a of the caulking portion 32 that is formed on the internal terminal 30. In other words, the water droplet W1 is restrained from entering the gap between the external terminal 20 and the internal terminal 30 at the joint portion 40.

That is, since the pedestal surface 22a is located higher than the non-joint surface 20a, the water droplet W1 that has adhered to the non-joint surface 20a has difficulty moving beyond the pedestal 22. In other words, the pedestal 22 plays the role of a dike. Accordingly, the water droplet W1 is unlikely to reach the gap between the pedestal surface 22a (the joint surface) of the pedestal 22 and the joint surface 32a of the caulking portion 32.

Besides, the caulking portion 32 is formed so as to be equipped with a bulge portion 32b that bulges more outward than the pedestal 22. That is, the caulking portion 32 is formed such that a caulking diameter D2 thereof is larger than the diameter D1 of the pedestal surface 22a. Thus, a water droplet W2 that has adhered to an upper side of the caulking portion 32 (i.e., an upper side of the internal terminal 30) is restrained from entering the gap between the pedestal surface 22a (the joint surface) of the pedestal 22 that is formed on the external terminal 20 and the joint surface 32a of the caulking portion 32 that is formed on the internal terminal 30. In other words, the water droplet W2 is restrained from entering the gap between the external terminal 20 and the internal terminal 30 at the joint portion 40.

Specifically, the caulking portion 32 is equipped with the bulge portion 32b that bulges more outward than the pedestal 22, so the water droplet W2 that has adhered to the upper side of the caulking portion 32 falls onto the non-joint surface 20a of the external terminal 20 without falling onto the pedestal surface 22a. That is, the caulking portion 32 plays the role of an umbrella. In consequence, the water droplet W2 is unlikely to reach the gap G1 between the pedestal surface 22a and the joint surface 32a, which is located inside an end portion of the caulking portion 32. Incidentally, the water droplet (the water droplet W1) that has fallen onto the non-joint surface 20a of the external terminal 20 has difficulty moving beyond the pedestal 22 as described above. Accordingly, the water droplet W2 is unlikely to reach the gap between the pedestal surface 22a (the joint surface) of the pedestal 22 and the joint surface 32a of the caulking portion 32.

Incidentally, the height H1 of the pedestal surface 22a may be appropriately determined in accordance with the amount of the liquid water that can be produced through condensation or the like. That is, the height H1 of the pedestal surface 22a may be made high, for example, in the case where the battery 1 is used in a region where condensation often occurs. By the same token, the caulking diameter D2 may also be appropriately determined in accordance with the amount of the liquid water that can be produced through condensation or the like. That is, the caulking diameter D2 may be made larger than the diameter D1 of the pedestal surface 22a, for example, in the case where the battery 1 is used in a region where condensation often occurs.

Comparative Example

Figure 5:
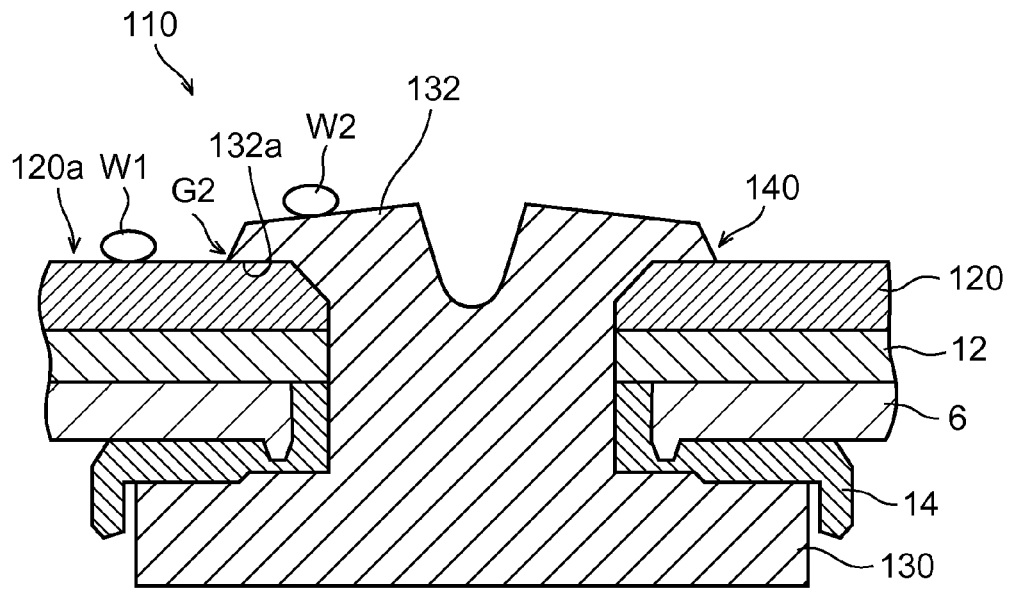
FIG. 5 is a cross-sectional view showing the configuration of a terminal component according to a comparative example.

The configuration according to the first embodiment of the invention will be further described hereinafter using a comparative example. FIG. 5 is a cross-sectional view showing the configuration of a terminal component 110 according to the comparative example. As is the case with the first embodiment of the invention, the terminal component 110 has an external terminal 120 and an internal terminal 130. Then, the internal terminal 130 is caulked against the external terminal 120, so a caulking portion 132 is formed on the internal terminal 130. Thus, the external terminal 120 and the internal terminal 130 are linked with each other at a joint portion 140.

It should be noted herein that the caulking portion 132 of the internal terminal 130 is in contact with an upper surface 120a of the external terminal 120 in the comparative example, as opposed to the first embodiment of the invention. That is, a joint surface 132a of the caulking portion 132 is in contact with the upper surface 120a of the external terminal 120. At this time, a gap G2 between the joint surface 132a of the caulking portion 132 and the upper surface 120a of the external terminal 120 is located as high as the upper surface 120a. Alternatively, the upper surface 120a dents due to the pressing of the upper surface 120a of the external terminal 120 by the caulking portion 132, so the gap G2 can be located lower than the upper surface 120a. Accordingly, the water droplet W1 that has adhered to the upper surface 120a of the external terminal 120 may easily enter the gap G2 between the joint surface 132a of the caulking portion 132 and the upper surface 120a of the external terminal 120.

Furthermore, the water droplet W2 that has adhered to an upper side of the caulking portion 132 also enters easily into the gap G2 when falling from the caulking portion 132. That is, since an outer end portion of the caulking portion 132 is located substantially at the same position as an end portion of the gap G2, the water droplet W2 easily reaches the gap G2 when falling from the caulking portion 132, and hence easily enters the gap G2. Besides, even if the water droplet W2 falls onto the upper surface 120a of the external terminal 120, the water droplet (W1) that has fallen onto the upper surface 120a easily enters the gap G2 as described above.

Figure 6:
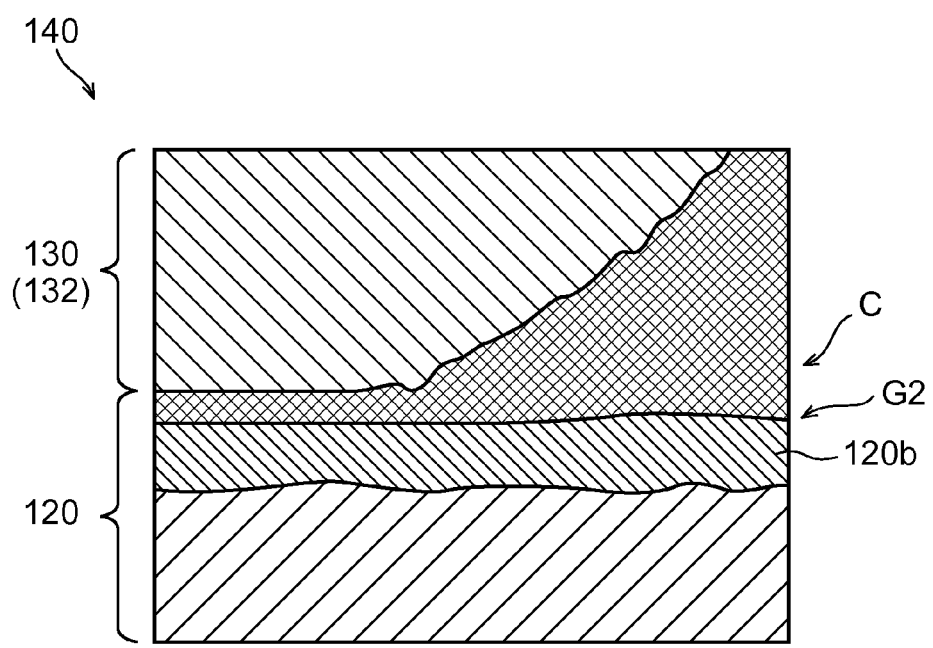
FIG. 6 is an enlarged cross-sectional view of a joint portion where a water droplet entered according to the comparative example.

FIG. 6 is an enlarged cross-sectional view of the joint portion 140 where a water droplet enters. Incidentally, as shown in FIG. 6, the surface of the external terminal 120 (the external terminal 20) is covered with a tin coat 120b. As described above, the water droplet enters the gap G2 in the comparative example. Accordingly, the joint portion 140 (especially the internal terminal 130) is oxidized by the moisture (water) that has entered the gap G2. Thus, the internal terminal 130 corrodes as indicated by an arrow C. Due to this corrosion, the conduction resistance (electric resistance) between the external terminal 120 and the internal terminal 130 rises.

On the other hand, as described above, in the first embodiment of the invention, the external terminal 20 is provided with the pedestal 22, so the water droplet W1 that has adhered to the upper surface (the non-joint surface 20a) of the external terminal 20 is restrained from entering the gap between the external terminal 20 and the internal terminal 30 at the joint portion 40. Besides, in the first embodiment of the invention, the internal terminal 30 is equipped with the bulge portion 32b, and the caulking portion 32 is formed so as to bulge more outward than the pedestal 22. Thus, the water droplet W2 that has adhered to the upper side of the caulking portion 32 is restrained from entering the gap between the external terminal 20 and the internal terminal 30 at the joint portion 40. That is, in the first embodiment of the invention, the water droplet that has adhered to the surface of each of the terminal components 10 is restrained from entering the gap between the external terminal 20 and the internal terminal 30 at the joint portion 40.

Accordingly, in the first embodiment of the invention, the internal terminal 30 and the external terminal 20 can be restrained from corroding at the joint portion 40. Besides, this makes it possible to restrain the conduction resistance between the external terminal 20 and the internal terminal 30 from rising in the first embodiment of the invention.

Furthermore, in the first embodiment of the invention, the internal terminal 30 and the external terminal 20 can be joined to each other while restraining the internal terminal 30 and the external terminal 20 from corroding at the joint portion 40, by providing the external terminal 20 with the pedestal 22 at the joint portion 40. Accordingly, the first embodiment of the invention makes it unnecessary to provide the configuration for restraining corrosion separately from the joint portion 40. For example, there is no need to subject the surface of the internal terminal 30 (especially the location of the joint surface 32a) to a special treatment for preventing corrosion or the like.

Furthermore, the conduction resistance between the external terminal 20 and the internal terminal 30 can be restrained from rising even when adhesion joining is adopted in joining the external terminal 20 and the internal terminal 30 to each other, by using the configuration according to the first embodiment of the invention. Accordingly, the joint with the conduction resistance between the external terminal 20 and the internal terminal 30 restrained from rising can be realized without adopting high-cost laser welding.

Second Embodiment

Figure 7:
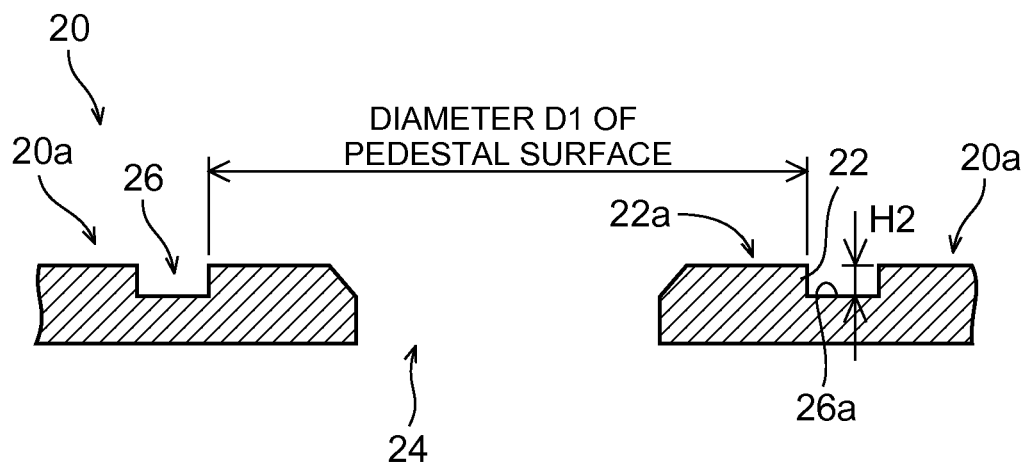
FIG. 7 is a cross-sectional view showing the structure of an external terminal according to the second embodiment of the invention.

Next, the second embodiment of the invention will be described. FIG. 7 is a cross-sectional view showing the structure of the external terminal 20 according to the second embodiment of the invention. The second embodiment of the invention is different from the first embodiment of the invention in that the non-joint surface 20a of the external terminal 20 is equipped with a recess portion 26. Besides, in the second embodiment of the invention, the entire non-joint surface 20a need not be formed so as to be located lower than the pedestal surface 22a (the joint surface).

The recess portion 26 is formed in the shape of, for example, a groove with a substantially rectangular cross-section. The recess portion 26 is formed in such a manner as to surround the outside of the pedestal 22. For example, the recess portion 26 may be formed such that a part of the upper surface (the non-joint surface 20a) of the external terminal 20 becomes lower than the pedestal surface 22a along the outside of the position corresponding to the pedestal 22. Thus, the recess portion 26 with a depth of H2 (mm) is formed. In other words, a bottom surface 26a of the recess portion 26 is configured to be located lower than the other part of the non-joint surface 20a by H2. Incidentally, the bottom surface 26a of the recess portion 26 is part of the non-joint surface 20a.

Besides, through formation of the recess portion 26, the pedestal 22 having the pedestal surface 22a that is located higher than the bottom surface 26a (part of the non-joint surface 20a) by H2 (mm) is formed. In this manner, the second embodiment of the invention makes it possible to form the pedestal 22 simply by forming the groove-shaped recess portion 26. In other words, the entire non-joint surface 20a outside the pedestal 22 need not be made lower than the pedestal surface 22a. Accordingly, it is easier to mold the external terminal 20 than in the first embodiment of the invention. Besides, there is no need to reduce the entire thickness of the part corresponding to the non-joint surface 20a of the external terminal 20 in comparison with the first embodiment of the invention. Therefore, the strength of the external terminal 20 is enhanced in comparison with the first embodiment of the invention.

Besides, the bottom surface 26a of the recess portion 26 is located lower than the other part of the non-joint surface 20a. Accordingly, in the case where water droplet has adhered to the non-joint surface 20a, the water droplet enters the recess portion 26. Furthermore, the bottom surface 26a of the recess portion 26 is located lower than the pedestal surface 22a of the pedestal 22. Accordingly, the moisture (water) that has entered the recess portion 26 has difficulty reaching the pedestal surface 22a.

Thus, water droplet is unlikely to reach the gap between the pedestal surface 22a (the joint surface) of the pedestal 22 and the joint surface 32a of the caulking portion 32. In other words, water droplet is restrained from entering the gap between the external terminal 20 and the internal terminal 30 at the joint portion 40. Thus, in the second embodiment of the invention as well as the first embodiment of the invention, the internal terminal 30 and the external terminal 20 can be restrained from corroding at the joint portion 40. Accordingly, the conduction resistance between the external terminal 20 and the internal terminal 30 can be restrained from rising.

Incidentally, the dimension of the recess portion 26 may be appropriately determined in accordance with the amount of the liquid water that can be produced through condensation or the like. The depth H2 of the bottom surface 26a of the recess portion 26 may be increased, for example, in the case where the battery 1 is used in a region where condensation often occurs. Besides, in this case, the width of the recess portion 26 as well as the depth of the recess portion 26 may be increased. Incidentally, if the dimension of the recess portion 26 is made too large, it may be impossible to maintain the strength of the external terminal 20. Accordingly, the configuration according to the second embodiment of the invention may be adopted in the case where the amount of the water droplet adhering to each of the terminal components 10 is small.

Figure 8:
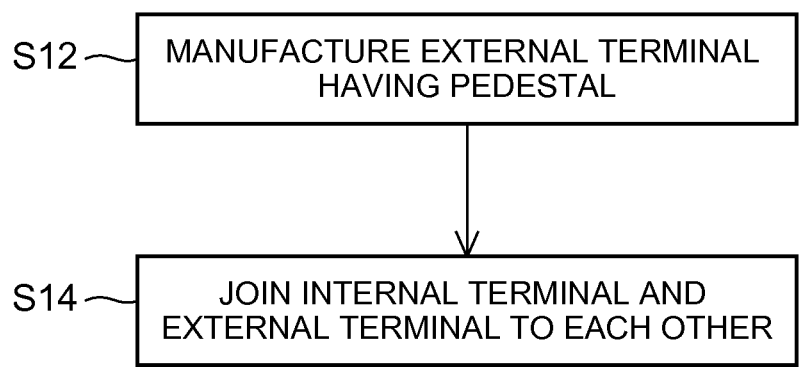
FIG. 8 is a flowchart for explaining a method of manufacturing a terminal component according to each of the present embodiments of the invention.

(Method of Manufacturing Terminal Component) A method of manufacturing each of the terminal components 10 according to each of the present embodiments of the invention will be described hereinafter. FIG. 8 is a flowchart for explaining the method of manufacturing each of the terminal components 10 according to each of the present embodiments of the invention. In a first process (S12), the external terminal 20 having the pedestal 22 is manufactured. Specifically, in the case where the external terminal 20 according to the first embodiment of the invention is manufactured, the external terminal 20 shown in FIG. 3 is manufactured. In this case, as described above, the pedestal 22 may be formed by, for example, subjecting the external terminal 20 to pressing, forging or the like such that a part outside the position corresponding to the pedestal 22 on the upper surface of the external terminal 20 becomes lower than the pedestal surface 22a. This manufacturing makes it easy to mold the pedestal 22.

Besides, in the case where the external terminal 20 according to the second embodiment of the invention is manufactured, the external terminal 20 shown in FIG. 7 is manufactured. In this case, as described above, the recess portion 26 may be formed by subjecting the external terminal 20 to pressing, forging or the like such that the upper surface (the non-joint surface 20a) of the external terminal 20 becomes lower than the pedestal surface 22a along the outside of the position corresponding to the pedestal 22. This manufacturing makes it possible to mold the pedestal 22 without reducing the entire thickness of the part corresponding to the non-joint surface 20a.

Subsequently in a second process (S14), the internal terminal 30 and the external terminal 20 are joined to each other. Specifically, as described above using FIG. 4, part of the internal terminal 30 (the protrusion portion 34) is passed through the through-hole 24 that is provided through the external terminal 20, and is protruded above the external terminal 20. Then, this protruded protrusion portion 34 is pressed and expanded so as to come into contact with the upper surface of the pedestal 22 (the pedestal surface 22a). Thus, the internal terminal 30 is joined to the external terminal 20. At this time, the caulking portion 32 of the internal terminal 30 is formed so as to be equipped with the bulge portion 32b that bulges more outward than the pedestal 22.

Modification Example

Incidentally, the invention is not limited to the aforementioned embodiments thereof. For example, the configuration according to the second embodiment of the invention may be applied to the first embodiment of the invention.

Specifically, the recess portion 26 may be further formed around the pedestal 22 having the pedestal surface 22a that is located higher than the non-joint surface 20a by H1 as in the first embodiment of the invention. In this case, the pedestal surface 22a is located higher than the bottom surface 26a of the recess portion 26 by H1+H2 (mm). Accordingly, water droplet is further restrained from entering the gap between the external terminal 20 and the internal terminal 30 at the joint portion 40, in comparison with the first and second embodiments of the invention.

What is claimed is:

1. A terminal component comprising:
   an external terminal that is provided above a cover covering an electrode body; and
   an internal terminal that is provided below the cover and extends through a through-hole of the external terminal,
   wherein a part of the internal terminal protrudes above the external terminal,
   a dimension of the part of the internal terminal in a radial direction of the through-hole is larger than a diameter of the through-hole,
   the external terminal has a joint surface that is a first part of an upper surface of the external terminal and that is joined to the internal terminal, and a non-joint surface that is a second part of the upper surface of the external terminal and that is located outside the joint surface, and
   the joint surface is located higher than at least part of the non-joint surface,
   wherein the non-point surface of the external terminal includes a recess portion formed as an annular groove.

2. The terminal component according to claim 1, wherein the part of the internal terminal is equipped with a bulge portion that bulges more outward than the joint surface of the external terminal.

3. A method of manufacturing a terminal component, comprising:
   manufacturing an external terminal having a through-hole, a pedestal that is provided outside the through-hole, and a non-joint surface that is formed outside the pedestal so as to be located lower than an upper surface of the pedestal; and
   joining an internal terminal and the external terminal to each other by passing part of the internal terminal through the through-hole of the external terminal in such a manner as to protrude a part of the internal terminal above the external terminal, and expanding the protruded part of the internal terminal in such a manner as to come into contact with the upper surface of the pedestal,
   wherein the external terminal has a joint surface that is a first part of an upper surface of the external terminal and that is joined to the internal terminal, and the non-joint surface is a second part of the upper surface of the external terminal that is located outside the join surface, and
   the joint surface is located higher than at least part of the non-joint surface,
   wherein the non-joint surface of the external terminal includes a recess portion formed as an annular groove.

4. The terminal component according to claim 1, wherein a height of the joint surface is the same as a height of a part of the non-joint surface other than the recess portion.

* * * * *